United States Patent [19]

Testin et al.

[11] Patent Number: 4,641,064
[45] Date of Patent: Feb. 3, 1987

[54] TELEVISION POWER SUPPLY SHUTDOWN CIRCUIT

[75] Inventors: William J. Testin, Indianapolis, Ind.; Michael P. French, Huntsville, Ala.

[73] Assignee: RCA Corporation, Princeton, N.J.

[21] Appl. No.: 728,657

[22] Filed: Apr. 29, 1985

[51] Int. Cl.⁴ .................. H01J 29/70; H04N 5/68
[52] U.S. Cl. ........................... 315/411; 358/243; 358/190
[58] Field of Search ........... 315/411; 358/243, 190, 358/220; 361/75; 363/50

[56] References Cited

U.S. PATENT DOCUMENTS

| | | | |
|---|---|---|---|
| 3,553,530 | 1/1971 | Gregson | 361/75 |
| 3,657,603 | 4/1972 | Adams | 361/75 |
| 3,725,739 | 4/1973 | Griffey | |
| 3,970,915 | 7/1976 | Suchko | |
| 4,042,858 | 8/1977 | Collette et al. | |
| 4,045,742 | 8/1977 | Meehan et al. | |
| 4,115,814 | 9/1978 | Kosaka et al. | |
| 4,321,513 | 3/1982 | Knight | 358/243 |
| 4,335,335 | 6/1982 | Willis | 315/411 |
| 4,344,101 | 8/1982 | Oishi et al. | 361/75 |
| 4,387,324 | 6/1983 | Willis | 315/411 |
| 4,389,676 | 6/1983 | Balaban et al. | 315/411 |
| 4,435,731 | 3/1984 | Kliebphipat et al. | 315/411 |
| 4,489,394 | 12/1984 | Borg | |

OTHER PUBLICATIONS

U.S. patent application Ser. No. 445,776, entitled Shutdown Circuit for a Switching Regulator in a Remote Controlled Television Receiver, in the name of J. E. Hicks, filed 11/30/82.
Technical Information Report No. 006, "Switching Regulator Control IC (AN5900)", Semiconductor Division Matsushita.
Electronics Corporation, published prior to the filing date of this U.S. patent application.
Color Television Basic Service Data Manual for CTC 111 Chassis Series, Cover Sheet and Schematic, pp. 36, 37 of MSC 025, F.S. Tuner Control Module.
U.S. patent application Ser. No. 728,661, entitled Television Power Supply Turn-On Protection Circuit in the names of W. J. Testin et al, filed concurrently with the above-captioned patent application.

Primary Examiner—Theodore M. Blum
Assistant Examiner—David Cain
Attorney, Agent, or Firm—Eugene M. Whitacre; Joseph J. Laks; Sammy S. Henig

[57] ABSTRACT

In a power-up mode, the power supply of a television receiver generates the normal operating level of an energizing voltage. An overload detector generates a first control signal to shutdown the power supply and remove the energizing voltage when an overload condition occurs. A control circuit periodically samples the level of the energizing voltage. When the level is lower than normal, the control circuit generates a second control signal that maintains the power supply in the shut-down mode so as to prevent the power supply from attempting to restart. A third control signal inhibits the generation of the second control signal when an input alternating current voltage that supplies the power to the power supply suffers a voltage drop or blackout for only a short duration.

16 Claims, 3 Drawing Figures

TELEVISION POWER SUPPLY SHUTDOWN CIRCUIT

The invention relates to a power supply protection arrangement in a television receiver.

Some prior art television receivers include a surge current protection circuit that protects, for example, a horizontal deflection output transistor switch of a deflection circuit that generates ultor voltage from being damaged when an overload condition occurs as a result of, for example, excessive cathode ray tube (CRT) beam current drain from the ultor voltage. Such prior art surge current protection circuit is able to shut-down a direct current (DC) voltage source that energizes the horizontal deflection output transistor. The voltage shut-down causes the surge of current to disappear. In such prior art current protection circuit, a persisting cause for the overload condition does not prevent, for example, the DC voltage source that energizes the horizontal output transistor from being powered-up again after the initial shut-down. This is so because the surge of current that initially caused the voltage shut-down, disappears as a result of, for example, the DC voltage shut-down, even though the cause for the overload condition was not removed. After the power is restored following the voltage shut-down, and in the face of the persistent overload condition cause, the surge current protection circuit would, again, cause the shut-down of the DC voltage source that energizes the horizontal deflection output transistor. This repeated, or oscillatory, situation was found to degrade the reliability of the television receiver circuits because the repeated current surge increases the stress on circuit components that are thus continually and cyclically affected by the overload condition. Such overload condition caused by excessive high ultor current is likely to occur when a source of external video signal such as a VCR or a home computer supplies the video signal to the television set. It is desirable to prevent restoration of the DC voltage source after an overload condition has occurred so as to avoid the oscillatory condition of the surge current that is typical in some prior art circuits.

In accordance with an aspect of the invention, a television apparatus supply source includes a power supply with a fault condition protection that selectively operates in a power-up mode and in a shut-down mode. In the power-up mode, the power supply generates under normal operating conditions, a normal operating level of a first supply voltage that is indicative of the presence of the normal operating conditions. In the shut-down mode, the level of the first supply voltage is lower than in the power-up mode. The power supply is responsive to first and second control signals for assuming the shut-down mode when either the first or the second control signal is provided. A fault detector that is responsive to a signal that is indicative of the fault condition generates the first control signal when the fault condition occurs in the power supply. The first control signal causes the power supply to be in the shut-down mode only during a first interval that follows the fault condition occurrence. The first supply voltage is periodically sampled for generating the second control signal when the magnitude of the first supply voltage is below the normal operating level. The second control signal maintains the power supply in the shut-down mode after the end time of the first interval so as to prevent the power supply from assuming the power-up mode subsequent to the end time of the first interval.

In carrying out an aspect of the invention, a microcomputer periodically polls, or samples, the energizing voltage in each corresponding periodic polling step. When the microcomputer finds that the first supply voltage is at a level that is lower than the normal operating level following the occurrence of an overload condition, it causes the generation of the second control signal that maintains the power supply in the shut-down mode.

Generally, it may be desirable that the period between the periodic polling steps of the microcomputer is in the order of a few hundreds of milliseconds, illustratively 300 milliseconds, so as to respond timely to the overload condition for protecting circuit components.

When an alternating current (AC) power that supplies power to the power supply suffers a dropout, as a result of a brownout condition, the first supply voltage that is generated by the power supply may drop to be at a lower level than its normal operating level. It is desirable that after a short AC brownout period of, illustratively, two seconds, the television set resumes operation without user's intervention.

The second control signal may, undesirably, be generated also as a result of the occurrence of the brownout condition and force the power supply to be in the shut-down mode for a period of indefinite length following the next periodic polling step. Such brownout type shut-down mode could have occurred, not as a result of an overload condition, but rather as a result of AC power dropout. This situation is undesirable in that it is disruptive to the user and it is not essential or contributing for improving the reliability of the television set.

In accordance with still another aspect of the invention the periodic polling steps of the energizing voltage are suspended, or inhibited, during AC power dropout period. Thus the generation of the second control signal is inhibited during a brownout period that is shorter than a predetermined length.

In a television receiver that includes a feature such as a remote control input for controlling the operation of the receiver, a control circuit may include a microcomputer that is typically employed for decoding and executing user's commands. Typically, the microcomputer is powered by a stand-by voltage that enables the microcomputer to respond to user's commands even when the deflection circuit power supply is in the shut-down mode. One such user initiated command may be the power-on command by which the user requests to energize the television receiver. Such power-on command requires that the power supply be set in the power-up mode.

Advantageously, the same microcomputer of the control circuit may execute various user initiated commands such power-on, power-off, audio control, as well as, perform the periodic polling of the first supply voltage for generating the second control signal that forces the power supply to be in the shut-down mode after the overload condition has occurred.

In accordance with another aspect of the invention, the first supply voltage is produced by the deflection circuit. Thus, the fault condition protection circuit detects a fault condition in either the power supply or the deflection circuit. If the first supply voltage is not within the normal operating range during operation in the power-up mode, it may be desirable to shut down the power supply immediately. This is done for protecting both deflection and power supply circuit components.

In the event that the first supply voltage, that is indicative of normal operating voltages in the deflection circuit, is not at the normal operating level, after a predetermined interval has elapsed from the user power-on command, it may be desirable that the power supply immediately assumes the shut-down mode for protecting circuit components. In accomplishing this goal, the control circuit generates the second control signal that maintains the power-supply in the shut-down mode if the first supply voltage is not at the predetermined normal operating level after such predetermined interval has elapsed.

Figure 1:
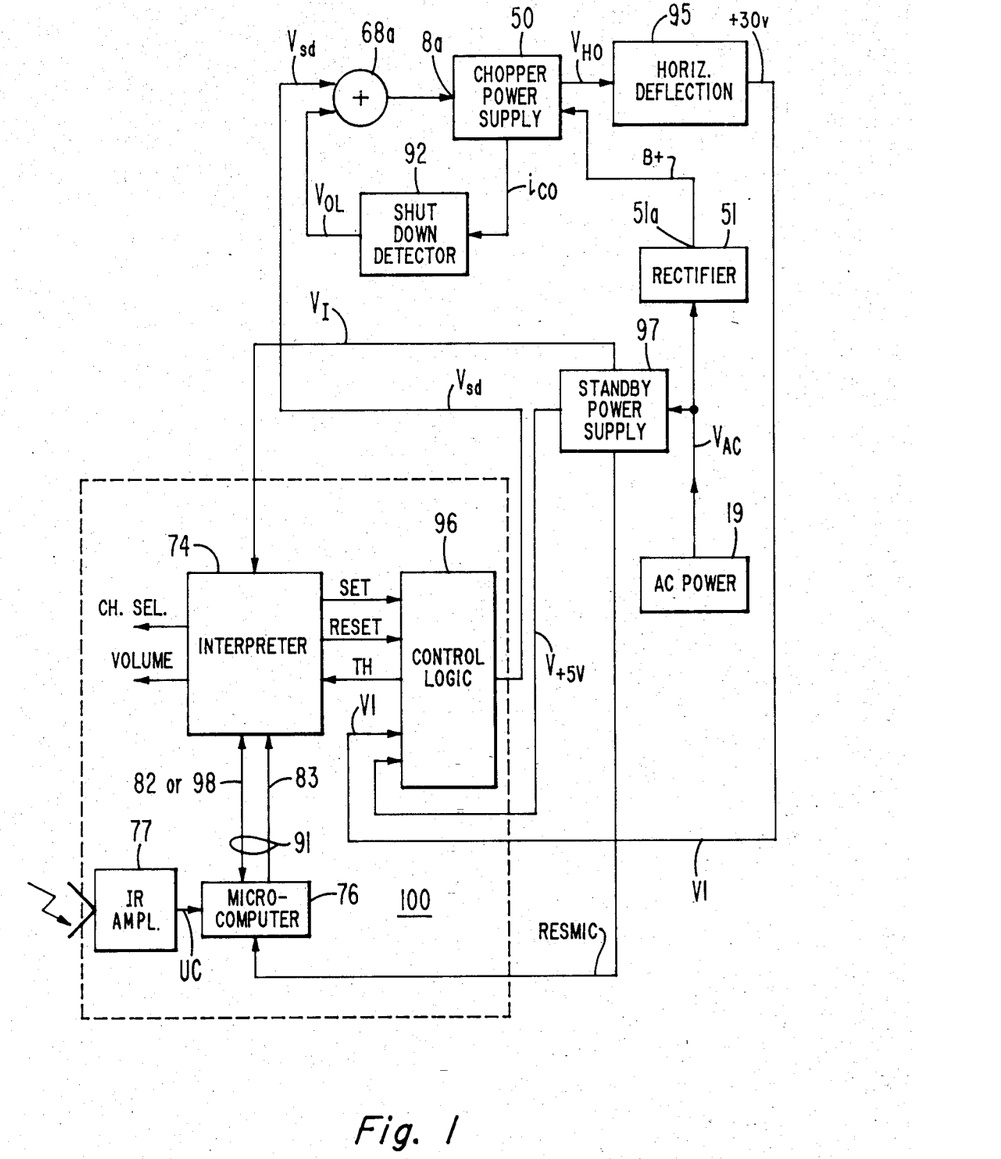
FIG. 1 illustrates a general block diagram of a power supply including a protection circuit, embodying an aspect of the invention, that provides power to a deflection circuit.

A voltage source 19 in FIG. 1 developing an AC voltage $V_{AC}$, is coupled to a bridge rectifier and filter 51 that develops an unregulated raw voltage B+ voltage at an output terminal 51a. Voltage B+ is coupled to a chopper power supply 50 that produces, in a power-up mode, a voltage $V_{HO}$ that energizes a horizontal deflection circuit 95. Circuit 95 produces a DC energizing voltage V1 that is at a normal operating level when both voltage $V_{HO}$ is at its normal operating level and deflection circuit 95 operates properly. A shut-down detector 92 generates a signal $V_{OL}$ when it detects a surge of a current $i_{co}$ in power supply 50 that characterizes an overload condition. Signal $V_{OL}$ causes power supply 50 to operate in a shutdown mode. In the shut-down mode, current $i_{co}$ stops flowing; consequently, voltage $V_{HO}$ drops to a lower level than its normal operating level. However, shut-down detector 92 cannot, by itself, keep power supply 50 in the shut-down mode for a longer period than, illustratively, 250 milliseconds. After such 250 millisecond period has elapsed, shut-down detector 92 is not able to inhibit power supply 50 from returning to the power-up mode. It may be undesirable to permit the recurrence of the power-up mode that follows the shut-down mode initiated by detector 92. This is so because, should the fault condition, that causes detector 92 to initiate the shut-down mode, persist, such a return to the power-up mode may damage television receiver circuit components.

In accordance with an aspect of the invention, a shut-down signa $V_{sd}$ that is coupled to power supply 50 from a control circuit 100, via a signal summing junction 68a, prevents the recurrence of the power-up mode that would otherwise follow, as described later on. Control unit 100 includes a microcomputer 76. Microcomputer 76 receives a user command signal UC, provided from, illustratively, an infra-red amplifier 77 that translates modulated infra-red radiation pulses to serial data stream. Typically, an infra-red transmitter, not shown in the figures, is used for transmitting remote control user initiated commands such as power-on, power-off, volume control and channel select. Microcomputer 76 translates the user commands obtained from signal UC to provide, to an interpreter 74, a data word 82 and a synchronizing clock 83 through a bidirectional serial buss 91. The functions provided by interpreter 74 may be performed by conventionally designed logic circuitry or by multipurpose hardware such as another microcomputer.

Interpreter 74 generates a signal SET and a signal RESET that are coupled to a control logic 96, in response to power-on and power-off user initiated commands, respectively. Interpreter 74 also generates signals CH.SEL. and signals VOLUME that select, for example, in a conventional manner, the desired channel to be viewed and audio volume level, respectively. Control logic 96 also receives voltage V1 from deflection circuit 95 and a voltage $V_{+5 V}$ from a stand-by power supply arrangement 97 that is energized by AC voltage $V_{AC}$ even during the power-down mode interval of main power supply 50. Voltage $V_{+5 V}$ provides, for example, power to all the circuitry within control circuit 100 even when power supply 50 is in the shut-down mode. Power supply 97 also generates a signal RESMIC that is indicative of a dropout of AC voltage $V_{AC}$ for initializing, or resetting, microcomputer 76 throughout the time in which AC voltage $V_{AC}$ suffers a dropout. Control logic 96 supplies a signal TH to interpreter 74 that can be read in by microcomputer 76. Signal TH is asserted, that is to say, Signal TH=TRUE or HIGH, for example, if either voltage V1 or $V_{+5 V}$ is below the normal operating level.

Figure 3:
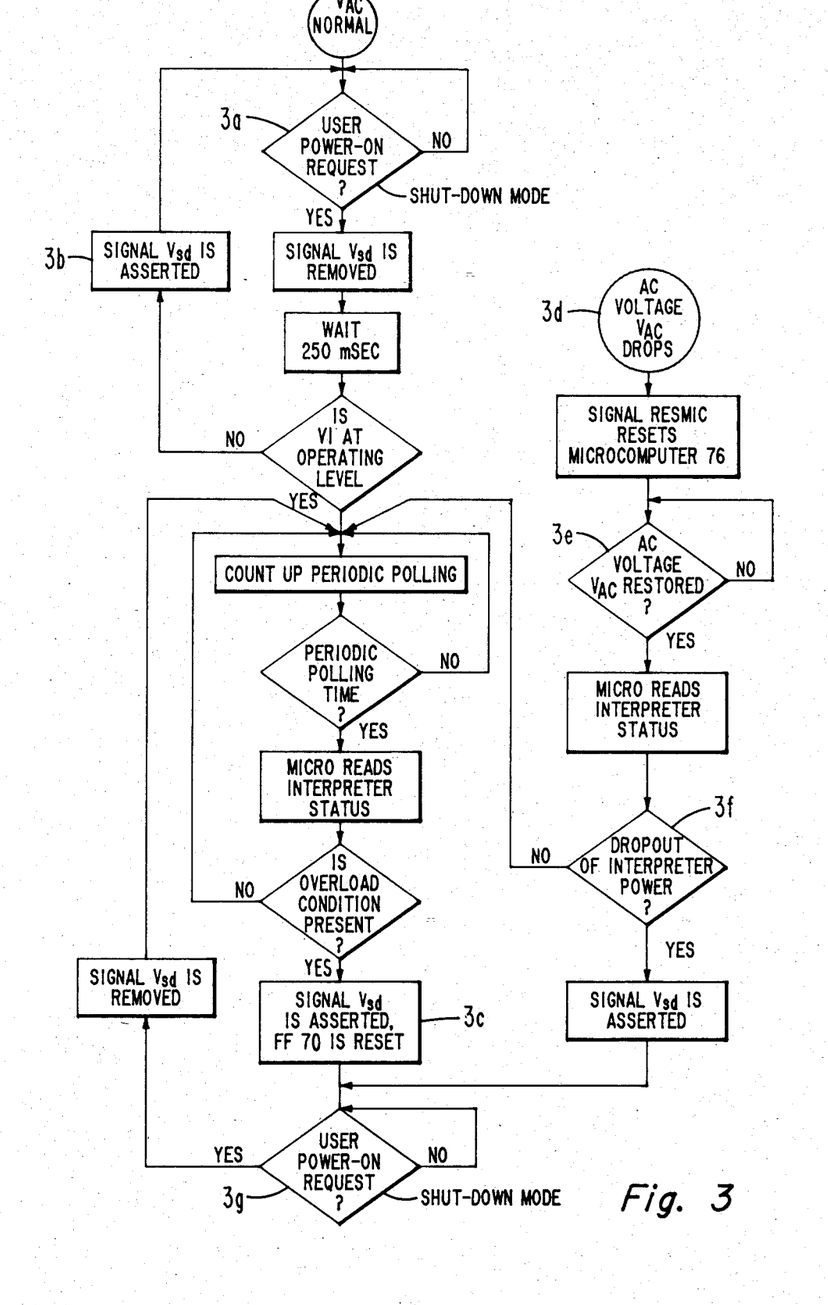
FIG. 3 illustrates a flow chart useful in explaining the operation of the circuit of FIGS. 1 or 2.

The operation of the circuit of FIG. 1 is explained using the flow chart illustrated in FIG. 3. Similar numbers and symbols, in FIGS. 1 and 3 indicate similar items or functions.

Prior to the user initiated power-on command, shut-down signal $V_{sd}$ is asserted for maintaining power supply 50 in the shut-down mode. When power-on command is issued, as shown in step 3a of FIG. 3, signal $V_{sd}$ of FIG. 1 is removed, chopper power supply 50 begins operation, and a wait period of, illustratively, 250 milliseconds begins. If at the end of the wait period voltage V1 is not at the normal operating level, as a result of, for example, a fault condition in deflection circuit 95, signal $V_{sd}$ is asserted and power supply 50 is forced into its shut-down mode, as shown in step 3b of FIG. 3; on the other hand, if voltage V1 of FIG. 1 is at the normal operating level, power supply 50 stays at the power-up mode.

In accordance with an aspect of the invention, during operation in the power-up mode, control circuit 100 initiates a periodic polling or sampling step at the end of each polling period of, illustratively, 300 milliseconds. In the periodic polling step, microcomputer 76 of control circuit 100 reads in, via buss 91, a data word 98 that contains the status of signal TH and other status information of interpreter 74, such as the volume control status. If a fault condition is not manifested so that signal TH is not asserted, microcomputer 76 begins timing-out the next following polling period.

However, in accordance with an aspect of the invention, if a fault condition is present signal TH will have been asserted and microcomputer 76 causes signal $V_{sd}$ to be asserted by sending corresponding data word 82 instruction to interpreter 74, as shown in step 3c of the flow chart of FIG. 3. As a result of signal $V_{sd}$ of FIG. 1, power supply 50 stays in the shut-down mode until a new user initiated power-on command is issued.

Assume, hypothetically, that during the operation in the power-up mode the amplitude of AC voltage $V_{AC}$ drops, as shown in step 3d of FIG. 3. Consequently, signal RESMIC of FIG. 1 is developed which then causes microcomputer 76 to be in an initialization state as shown in step 3e of FIG. 3.

In accordance with another aspect of the invention, so long as AC voltage $V_{AC}$ is not restored, microcomputer 76 of FIG. 1 is held in the initialization, or reset state, as indicated in step 3e of FIG. 3. When AC voltage $V_{AC}$ of FIG. 1 is restored, microcomputer 76 reads-in word 98 that contains the status of interpreter 74. A power supply status bit in word 98 informs microcomputer 76 whether a powering voltage $V_I$ of interpreter 74 that is produced in power supply 97 has dropped, as shown in step 3f of FIG. 3.

In accordance with yet another aspect of the invention, if powering voltage $V_I$ of interpreter 74 of FIG. 1 has not dropped, microcomputer 76 begins timing out the next periodic polling period and the power-up mode of power supply 50 is resumed. Interpreter 74 powering voltage $V_I$ is designed so that a short AC voltage $V_{AC}$ brownout period of, illustratively, two seconds, is not sufficient to cause a dropout of interpreter 74 powering voltage $V_I$. Thus after the end of such short AC voltage $V_{AC}$ brownout period, normal operation can be automatically resumed.

Conversely, if interpreter 74 powering voltage $V_I$ has previously dropped during the AC voltage $V_{AC}$ brownout period, signal RESET is asserted by interpreter 74. Signal RESET causes that voltage $V_{sd}$ is asserted, thus forcing power supply 50 to enter into the shut-down mode, and that power supply 50 stays in the shut-down mode even after AC voltage $V_{AC}$ is restored, as shown in step 3g of FIG. 3. Thus a user initiated power on command is required for resuming normal operation.

Figure 2:
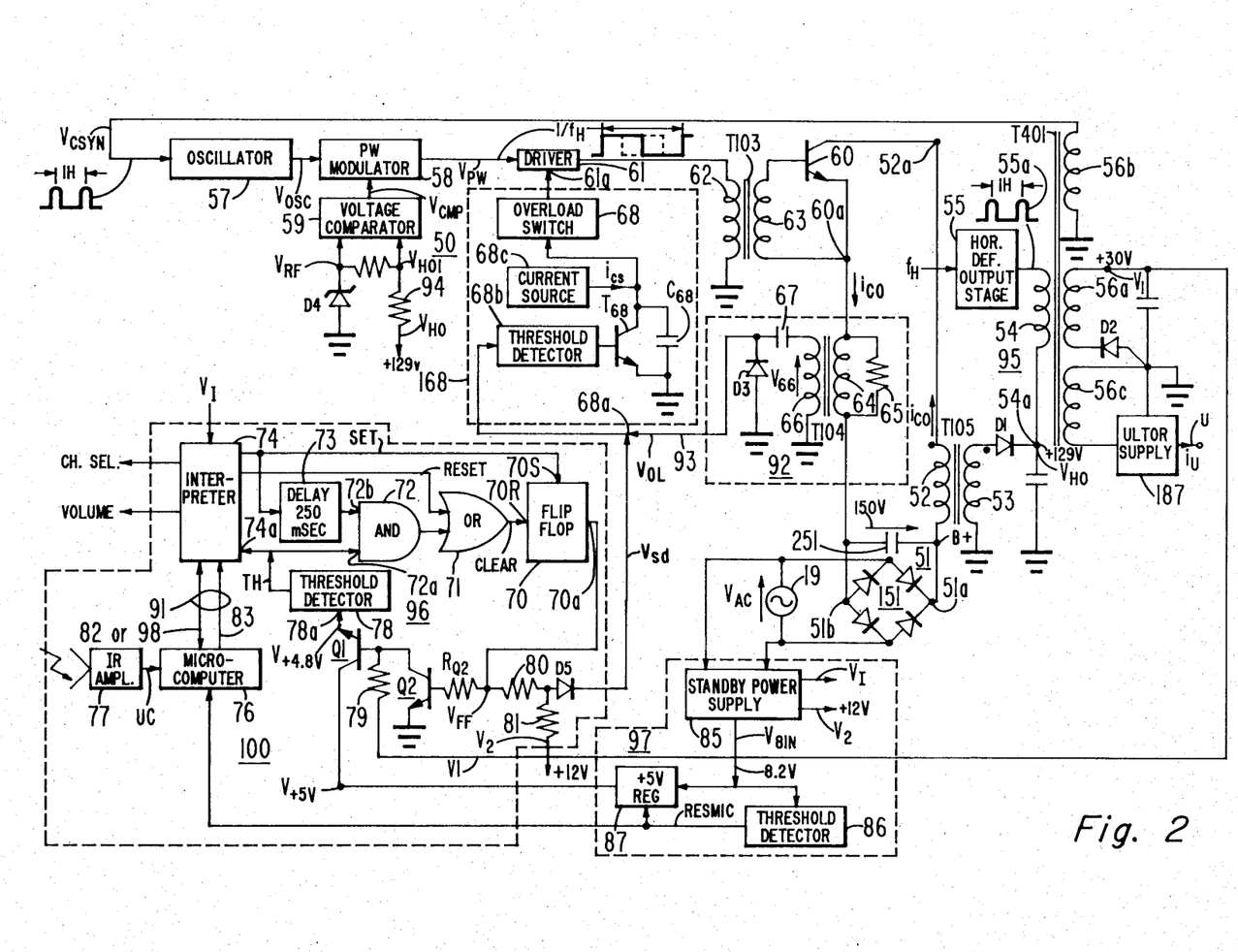
FIG. 2 illustrates a more detailed block diagram of the circuit of FIG. 1.

FIG. 2 illustrates a more detailed block diagram of the arrangement of FIG. 1. Similar numbers and symbols in FIGS. 1, 2 and 3 indicate similar items or functions. Referring to FIG. 2, terminal 51a of bridge rectifier 51 is coupled to one end terminal of a primary winding 52 of a chopper transformer T105. A second end terminal 52a of winding 52 is coupled to the output of a chopper output switch 60. A secondary winding 53 of transformer T105 develops a voltage that is rectified by a diode D1 to produce voltage $V_{HO}$ of, illustratively, 129 volts that energizes a primary winding 54 at a terminal 54a of a flyback transformer T401. Winding 54 is coupled to a conventionally built horizontal deflection output stage 55. Horizontal deflection output stage 55 is synchronized by horizontal sync pulses that are separated, by a conventional sync separator, from an output of a video detector that are not shown in figures.

A retrace pulse voltage 55a at primary winding 54 produces a like voltage across a secondary winding 56a that is rectified by a diode D2 to produce DC voltage V1 of, illustratively, 30 volts.

An ultor voltage power supply 187 is coupled to a secondary winding 56c for generating an ultor voltage U for a cathode ray tube (CRT) that is not shown in the figures. A secondary winding 56b of transformer T401 supplies a horizontal rate $f_H$ synchronizing voltage $V_{CSYN}$ that synchronizes a signal $V_{OSC}$ of an oscillator 57 of chopper power supply 50 to have the same operating frequency $f_H$. Horizontal rate voltage $V_{OSC}$, generated by oscillator 57, is coupled to a pulse width modulator 58 that generates a horizontal rate variable duty cycle voltage $V_{PW}$.

Voltage $V_{PW}$ is coupled to a driver 61 that drives a primary winding 62 of a transformer T103. The voltage developed at a secondary winding 63 of transformer T103 controls the turn-on time of output switch 60, and hence, the duty cycle of current $i_{co}$ that flows out of a terminal 60a of output switch 60. When switch 60 is conductive, in accordance with the active portion of voltage $V_{PW}$ duty cycle, terminal 52a of winding 52 of transformer T105 is coupled to terminal 60a to conduct current $i_{co}$ from terminal 60a. Current $i_{co}$ is thus conducted from terminal 60a, through an arrangement that includes a resistor 65 in parallel with a primary winding 64 of an overcurrent shut-down transformer T104 of shut-down detector 92, and to current return terminal 51b of bridge rectifier 151. When switch 60 is nonconductive, in accordance with the inactive portion of voltage $V_{PW}$ duty cycle, terminals 52a and 60a are not coupled so that current $i_{co}$ does not flow in primary winding 52.

Voltage $V_{PW}$ has a duty cycle that is determined in accordance with a voltage $V_{CMP}$ of a voltage comparator 59 that is also coupled to pulse width modulator 58. Voltage $V_{HO}$ from terminal 54a of winding 54, is coupled through a resistor 94 to produce a reference voltage $V_{RF}$ across a zener diode D4 and a voltage $V_{HO1}$ that follows the variations of voltage $V_{HO}$. Voltages $V_{HO1}$ and $V_{RF}$ are coupled to respective input terminals of comparator 59. Voltage $V_{CMP}$ is indicative of the difference between voltage $V_{HO1}$ and reference voltage $V_{RF}$. When voltage $V_{HO1}$ is larger than voltage $V_{RF}$, voltage $V_{CMP}$ causes that the duty cycle of voltage $V_{PW}$ and of current $i_{co}$ in winding 52 of transformer T105 to be, illustratively, shorter. Conversely, when voltage $V_{HO1}$ is smaller than voltage $V_{RF}$, voltage $V_{CMP}$ causes the duty cycle of voltage $V_{PW}$ and of current $i_{co}$ in winding 52 to be longer. Thus, comparator 59 voltage $V_{CMP}$ regulates the level of voltage $V_{HO}$ by controlling the duty cycle of current $i_{co}$ through winding 52 of transformer T105.

A voltage $V_{66}$, developed across a secondary winding 66 of shut-down transformer T104 is coupled through a capacitor 67 to produce, on a line 93, voltage $V_{OL}$ that appears at a control terminal 68a of a shut-down detector 92. Diode D3 allows substantially only positive pulses of voltage $V_{66}$, developed across winding 66, to appear at terminal 68a. A threshold detector 68b of a shutdown circuit 168, in power supply 50, is coupled to receive the voltage at terminal 68a. Threshold detector 68b causes a transistor $T_{68}$ to be conductive when the voltage at terminal 68a exceeds a threshold voltage. A capacitor $C_{68}$ is coupled between the emitter and collector electrodes of transistor $T_{68}$. When transistor $T_{68}$ is conductive, capacitor $C_{68}$ is immediately discharged. A current source 68c is coupled to the collector electrode of transistor $T_{68}$ for charging capacitor $C_{68}$ when transistor $T_{68}$ is nonconductive. The voltage across capacitor $C_{68}$ is coupled between respective input terminals of an overload switch 68 having an output terminal that is coupled to a terminal 61a of driver 61.

So long as the voltage across capacitor $C_{68}$ is below a first predetermined level, overload switch 68 is conductive. When switch 68 is conductive, it prevents driver 61 from energizing transformer T103, thus causing power supply 50 to be at its shut-down mode.

The power-up mode is initiated after the voltage at terminal 68a goes below the threshold voltage of detector 68b. This causes transistor $T_{68}$ to be nonconductive. The result is that current source 68c generates a ramping-up voltage across capacitor $C_{68}$. It takes, illustratively, 250 milliseconds period to charge capacitor $C_{68}$ to a voltage that exceeds the first predetermined level. At the end of the 250 millisecond period, switch 68, that becomes nonconductive, activates driver 61. Thus operation in the power-up mode of power supply 50 is resumed.

The functions performed by shut-down circuit 168, PW modulator 58 and voltage comparator 59 of power supply 50 of FIG. 2 may be similar to that of the switching regulator control IC AN5900 manufactured by the Semiconductor Divison of Matsushita Electronics Corporation, Tokyo, Japan. The operation of Control IC AN5900 is described in U.S. patent application Ser. No. 445,776 entitled, SHUTDOWN CIRCUIT FOR A SWITCHING REGULATOR IN A REMOTE CONTROLLED TELEVISION RECEIVER, in the name of J. E. Hicks, filed Nov. 30, 1983, and incorporated by reference herein. In IC AN5900, for example, shutdown is effected in a slightly different manner than that illustrated in FIG. 2. Shutdown is effected by controlling the voltage at an input terminal of a voltage comparator that is analogous to voltage comparator 59 of FIG. 2.

A voltage $V_{FF}$ at an inverted output terminal 70a of a flip-flop 70 of control unit 100 is coupled through a resistor 80 in series with a diode D5 to produce a shut-down voltage $V_{sd}$ at terminal 68a. Voltage $V_{FF}$ is produced by a voltage V2, of stand-by power supply 97, that is coupled through a pull-up resistor 81 and resistor 80 to terminal 70a. When flip-flop 70 is reset to a high output state at terminal 70a, voltage $V_{sd}$ at terminal 68a exceeds the threshold voltage of detector 68b, thus causing overload switch 68 to be conductive. As explained before, when switch 68 is conductive, chopper power supply 50 is in the shut-down mode. When flip-flop 70 is set to a low output state, at ground potential, for example, voltage $V_{sd}$ does not exceed the threshold voltage of detector 68b thus permitting power supply 50 to operate in its power-up mode; this is so provided that voltage $V_{OL}$ of detector 92 does not activate overload switch 68. In the power-up mode, voltage $V_{HO}$, for example, is at the appropriate level for enabling horizontal deflection circuit 55 to generate the required retrace pulse voltage 55a that energizes flyback transformer T401.

Voltage $V_{FF}$ is also coupled to the base electrode of a common emitter transistor switch Q2 through a resistor $R_{Q2}$. The collector electrode of transistor switch Q2 is coupled to the base electrode of a transistor switch Q1 and to a pull-up resistor 79. The end terminal of resistor 79 that is not coupled to the collector electrode is coupled to voltage V1, obtained from flyback transformer T401. The collector electrode of transistor switch Q1 is coupled to voltage $V_{+5\ V}$ that is, typically, +5 volts; the emitter electrode is coupled to an input terminal 78a of a threshold detector 78 to provide a voltage $V_{+4.8\ V}$. Threshold detector 78 causes that signal TH is asserted when voltage $V_{+4.8\ V}$ is lower than a predetermined threshold voltage. Signal TH is coupled to an input terminal 74a of interpreter 74 to provide information of voltage fault condition and to an input terminal 72a of an AND gate 72 for resetting flip-flop 70, as described below.

Interpreter 74 generates a pulse signal SET in response to a user's power-on command that sets flip-flop 70, causing voltage $V_{FF}$ to be low, thus enabling the power-up mode in chopper power supply 50. Interpreter 74 pulse signal SET is also coupled through a delay unit 73 to an input terminal 72b of AND gate 72. As described before, when pulse signal SET occurs, flip-flop 70 is set. After a delay time of 250 millisecond in delay unit 73, pulse signal SET that propogates through delay unit 73 will appear at terminal 72b of AND gate 72. If signal TH is, simultaneously, asserted at input terminal 72a of AND gate 72, the signal at its output terminal 72c is asserted, consequently, a signal CLEAR is generated by OR gate 71 that resets flip-flop 70. When flip-flop 70 is reset, voltage $V_{FF}$ generates signal $V_{sd}$. As explained before, signal $V_{sd}$ forces the shut-down mode in power supply 50.

Interpreter 74 signal RESET is coupled to an input terminal of an OR gate 71. Signal RESET may occur as a result of user initiated power-off command and when voltage $V_{AC}$ is first applied to the set. A second input terminal of OR gate 71 is coupled to the output terminal of AND gate 72. The output terminal of OR gate 71 is coupled to an input terminal 70R of flip-flop 70 to provide signal CLEAR that resets flip-flop 70 when either signal RESET or when both the signals at terminals 72a and 72b are asserted. When flip-flop 70 is reset, signal $V_{FF}$ is caused to be sufficiently high, by voltage V2 of stand-by power supply 97, for forcing power supply 50 into the shut-down mode.

AC voltage $V_{AC}$ also energizes a DC power supply 85 of standby power supply 97 that generates a voltage $V_{8IN}$ that is, illustratively, 8.2 volts. Voltage $V_{8IN}$ is coupled to a threshold detector 86 that asserts microcomputer 76 reset signal RESMIC when voltage $V_{8IN}$ falls below a predetermined threshold level. Signal RESMIC is also coupled to a control terminal of a regulator 87 that is coupled in series with voltage $V_{8IN}$. Regulator 87 supplies $V_{+5\ V}$ of, illustratively, +5 volts when voltage $V_{8IN}$ is above threshold detector 86 threshold level. In contrast, when signal RESMIC is asserted, voltage $V_{+5\ V}$ drops to zero volts. Voltage $V_{+5\ V}$ is coupled to the collector electrode of transistor switch Q1.

In response to a user initiated power-on command, microcomputer 76 sends an instruction via buss 91 to interpreter 74 that causes interpreter 74 to generate pulse signal SET. Consequently, flip-flop 70 is set and flip-flop 70 output voltage $V_{FF}$ is low, resulting in the initiation of the power-up mode in chopper power supply 50.

When voltage $V_{FF}$ is low, as a result of flip-flop 70 being set, transistor switch Q2 is nonconductive and base electrode of transistor switch Q1 current that is supplied from voltage V1 through resistor 79 causes transistor switch Q1 to be conductive, thereby coupling voltage $V_{+5\ V}$ to terminal 78a of threshold detector 78 to provide voltage $V_{+4.8\ V}$. If voltage $V_{+4.8\ V}$ is below the threshold level of detector 78, signal TH is asserted; otherwise, signal TH is not asserted.

Signal TH is asserted if, for example, voltage V1 is not generated as a result of a fault condition in power supply 50 or deflection circuit 95. If voltage V1 is not generated, transistor switch Q1 is nonconductive, so that voltage $V_{+4.8\ V}$ is not generated, causing signal TH to be asserted by detector 78. Shut-down mode is maintained until a subsequent user initiated power-up command is issued. During the shut-down mode, chopper output switch 60 prevents pulse current $i_{co}$ from flowing; therefore, flyback transformer T401 is not energized.

When voltage $V_{FF}$ is low, voltage $V_{sd}$ at terminal 68a of shutdown circuit 168 is low so that overload switch 68 is not activated. Therefore, driver 61 responds to voltage $V_{PW}$ from pulse width modulator 58 by activating chopper output switch 60. Switch 60 conducts current $i_{co}$ in winding 52. As a result of pulsed current $i_{co}$, an induced voltage across secondary winding 53 of transformer T105 is generated and rectified by diode D1 to provide flyback transformer T401 energizing voltage $V_{HO}$. Thus, power supply 50 operates in the power-up mode.

Assume, hypothetically, that, during the time that chopper power supply 50 is operating in the power-up mode, ultor current $i_u$ provided by ultor supply 187, increases excessively. The excessive increase in current may occur as a result of excessive video signal drive or arcings in the CRT. It follows that the amplitude of current $i_{co}$ through chopper output switch 60 will also increase in amplitude to satisfy the increased power demand by ultor voltage supply 187. A substantial surge of current $i_{co}$, that characterizes an overload condition, causes a corresponding increase in the amplitude of voltage $V_{OL}$ at terminal 68a of shutdown circuit 168. When voltage $V_{OL}$ exceeds the threshold level of detector 68b, overload switch 68 becomes conductive, thus initiating the shut-down mode of chopper power supply 50. When chopper power supply 50 is in the shut-down mode, voltage $V_{HO}$ that is coupled to flyback transformer T401 becomes low, causing ultor voltage U, current $i_u$, current $i_{co}$ and voltage V1 to drop substantially, thus protecting circuit components from being harmed.

Had voltage $V_{FF}$ remained low while the cause for the overload condition was continuing, chopper power supply 50 current $i_{co}$ would have been oscillatory. This is so because after the occurrence of the shut-down mode, current $i_{co}$ from terminal 60a of chopper output switch 60 is reduced substantially, thus causing voltage $V_{OL}$ that controls detector 68b to be low enough so as to discharge capacitor $C_{68}$. When capacitor $C_{68}$ is discharged by transistor $T_{68}$, overload switch 68 becomes nonconductive. With overload switch 68 being nonconductive, chopper power supply 50 is not prevented from reinitiating the power-up mode. If this situation were permitted to occur, current $i_{co}$ or voltage $V_{HO}$ would have gone up again at the end of a certain period after the beginning of the shut-down mode. This would cause the repetition of the overload type shutdown mode if the overload condition is a persistent one.

In accordance with an aspect of the invention, microcomputer 76 periodically polls signal TH of threshold detector 78 using, illustratively, a software driven time-out loop for establishing the polling period. The periodic polling is used for detecting the overload initiated shut-down mode in chopper power supply 50. If overload initiated shut-down mode is detected, during any periodic polling step, microcomputer 76 sends to interpreter 74 an instruction data word 82 via buss 91. Interpreter unit 74 responds to word 82 by generating signal RESET that causes signal CLEAR. Signal CLEAR resets flip-flop 70, causing voltage $V_{FF}$ to be sufficiently positive thus forcing overload switch 68 to be conductive. In this way, the shut-down mode is maintained indefinitely, or until a new user initiated power-on command is issued. Thus, microcomputer 76 prevents the oscillatory condition of current $i_{co}$ or voltage $V_{HO}$.

In accordance with a further aspect of the invention, in the event of a drop in voltage $V_{AC}$, as a result of AC power brownout, threshold detector 86 causes the assertion of signal RESMIC that causes voltage $V_{+5V}$ of regulator 87 to drop immediately. It should be understood that when voltage $V_{AC}$ drops, signal TH of detector 78 may be asserted. Simultaneously, microcomputer 76 is initialized by signal RESMIC. During the interval in which signal RESMIC is asserted, microcomputer 76 is in its initialization, or reset state, in which signal RESMIC controls the operation of microcomputer 76. For example, in the reset state, microcomputer 76 may not execute any instruction. Thus, asserted signal TH is prevented from causing the generation of signal $V_{sd}$. During the reset state, the periodic polling step is suspended until, illustratively, 300 millisecond period has elapsed from the time signal RESMIC disappears subsequent to voltage $V_{AC}$ recovery.

Thus, in accordance with an aspect of the invention, the normal periodic polling is suspended throughout the interval in which voltage $V_{AC}$ that energizes chopper power supply 50 is below a predetermined amplitude. Because the periodic polling is suspended, microcomputer 76 does not respond to the asserted signal TH by, for example, resetting flip-flop 70, as in step 3c of FIG. 3.

This feature of the invention is beneficial because, otherwise, a drop of voltage $V_{AC}$ of FIG. 2 would have caused microcomputer 76 initiated brownout type shut-down. Such brownout type shut-down mode would have occurred because signal TH of threshold detector 78 is asserted as a result of a drop of voltage $V_{AC}$, leading microcomputer 76, in, for example, step 3c of FIG. 3, to instruct interpreter 74 of FIG. 2 to issue signal RESET for resetting flip-flop 70. After voltage $V_{AC}$ is subsequently restored to the appropriate amplitude, chopper power supply 50 would have remained in the shut-down mode. Such brownout type shut-down mode is not desirable because it causes an undesirable interruption that necessitates a new user initiated power-on command for continuing television program viewing. This interruption would have occurred even as a result of a relatively short AC power brownout duration. Thus, in accordance with an aspect of the invention, such undesirable brownout type shut-down is prevented. On the other hand, if the brownout duration is relatively long, upon restoration of voltage $V_{AC}$ flip flop 70 remains in its reset state and signa $V_{sd}$ is asserted.

In each periodic polling step, microcomputer 76 interrogates interpreter 74 via serial buss 91 to find out, additionally, the channel that is being tuned and the volume control status. Elements 70–74 are powered by DC power supply 85, that maintains, substantially at a constant level, its other output voltage $V_I$ during the entire short dropout period of voltage $V_{AC}$. Voltage $V_I$ during such short dropout period is supplied, illustratively, by a large filter capacitance, not shown in the figures, that supplies the required operating current. Thus, for example, following the restoration of voltage $V_{AC}$ to normal amplitude after a short duration of voltage $V_{AC}$ drop, microcomputer 76 will obtain information regarding, for example, the channel status or the volume control status from a register of interpreter 74 that retains this information even during brownout. This feature enables microcomputer 76 to respond to, for example, a user command that requests the volume level to increase from the current level. Thus, even when microcomputer 76 loses volume level information during AC voltage $V_{AC}$ brownout, it can resume normal operation after voltage $V_{AC}$ is restored.

What is claimed:

1. A television power supply source with a fault protection comprising:
   an input energizing voltage source;

a main power supply coupled to said input energizing voltage that selectively operates in a power-up mode and in a shut-down mode, for generating from said input energizing voltage in said power-up mode a normal operating level of a first supply voltage, wherein when said power supply is in said shut-down mode, the level of said first supply voltage is lower than in said power-up mode, said power supply being responsive to first and second control signals for assuming said shut-down mode when either said first or second control signal is generated;

a fault detector for generating said first control signal when a fault condition occurs;

means responsive to said first control signal for causing said power supply to assume said shut-down mode only for a first interval after said fault condition has occurred;

periodic sampling means that periodically samples said first supply voltage for generating said second control signal therefrom; and means responsive to said second control signal for maintaining said power supply in said shut-down mode after the end of said first interval so as to prevent said power supply from subsequently assuming said power-up mode.

2. A supply source according to claim 1 wherein said power supply is coupled to a deflection apparatus for supplying a second supply voltage thereto and wherein said first supply voltage is generated by said deflection apparatus from said second supply voltage.

3. A supply source according to claim 2 wherein said periodic sampling means includes a microcomputer for periodically sampling said first supply voltage in a corresponding periodic sampling step to determine the level of said first supply voltage.

4. A supply source according to claim 3 wherein said microcomputer times out the period between said sampling step and the following sampling step.

5. A supply source according to claim 1 wherein said fault detector includes means for detecting current overload to generate said first control signal.

6. A supply source according to claim 1 wherein said power supply comprises a switched mode power supply including means for generating a pulse width modulated signal that controls, in accordance with the duty cycle thereof, the level of said first supply voltage, and wherein at least one of said first and second control signals substantially reduces such duty cycle when said fault condition occurs so as to lower the level of said first supply voltage.

7. A supply source according to claim 6 wherein each of said first and second control signals operates to substantially reduce the duty cycle of said pulse width modulated signal when said fault condition occurs.

8. A supply source according to claim 1 further comprising, means responsive to the level of said input energizing voltage for generating a third control signal during a brownout period wherein during said brownout period the level of said input energizing voltage is below its normal voltage level and wherein said sampling means includes means responsive to said third control signal for inhibiting the generation of at least one of said first and second control signals in accordance with said third control signal.

9. A supply source according to claim 8 wherein said inhibiting means inhibits the generation of said second control signal only when said brownout period is shorter than a predetermined length.

10. A supply source according to claim 8 wherein said sampling means is responsive to said third control signal so as to prevent said periodic sampling step from occurring during said brownout period, and wherein said inhibiting means inhibits the generation of said second control signal only when said brownout period is shorter than a predetermined length.

11. A supply source according to claim 10 wherein said sampling means include a microcomputer that times out the period between one sampling step and the following sampling step and wherein said microcomputer is responsive to said third control signal for preventing the periodic sampling from occurring.

12. A television power supply source with a fault protection comprising:

an input energizing voltage source;

a main power supply coupled to said input energizing voltage that selectively operates in a power-up mode and in a shut-down mode, for generating from said input energizing voltage in said power-up mode a normal operating level of a first supply voltage;

a detector responsive to said first supply voltage for generating an output signal when the level of said first supply voltage is below its normal operating level;

first means responsive to said detector output signal for generating a shutdown signal that causes said power supply to assume said shut-down mode;

second means responsive to the level of said input energizing voltage for generating a brownout period indicative signal during a brownout period, wherein during said brownout period the level of said input energizing voltage is substantially below its normal voltage level; and means responsive to said brownout period indicative signal and coupled to said first means for inhibiting said shut-down signal during said brownout period so that operation in the power-up mode is resumed when the normal operating level of said input energizing voltage is restored.

13. A television power supply source with a fault protection comprising:

an input energizing voltage source;

a main power supply coupled to said input energizing voltage that selectively operates in a power-up mode and in a shut-down mode, for generating from said input energizing voltage in said power-up mode a normal operating level;

first means responsive to said detector output signal for generating a shutdown signal that causes said power supply to assume said shut-down mode;

second means responsive to the level of said input energizing voltage for generating a brownout period indicative signal during a brownout period, wherein during said brownout period the level of said input energizing voltage is substantially below its normal voltage level, said brownout period indicative signal being coupled to said first means for inhibiting said shut-down signal during said brownout period so that operation in the power-up mode is resumed when the normal operating level of said input energizing voltage is restored;

means for asserting a power-up control signal that causes said power supply to assume said power-up mode; and a standby power supply that provides a supply voltage at a satisfactory operating level to said power-up control signal asserting means during said brownout period.

14. A television power supply source with a fault protection comprising:

an input energizing voltage source;

a main power supply coupled to said input energizing voltage that selectively operates in a power-up mode and in a shut-down mode, for generating from said input energizing voltage in said power-up mode a normal operating level of a first supply voltage;

a detector responsive to said first supply voltage for generating an output signal when the level of said first supply voltage is below its normal operating level;

a microcomputer responsive to said detector output signal for generating a shutdown signal that causes said power supply to assume said shut-down mode, said microcomputer periodically polling said output signal for generating said shut-down signal; and means responsive to the level of said input energizing voltage for generating a brownout period indicative signal during a brownout period, wherein during said brownout period the level of said input energizing voltage is substantially below its normal voltage level, said brownout period indicative signal being coupled to said first means for inhibiting said shut-down signal during said brownout period so that operation in the power-up mode is resumed when the normal operating level of said input energizing voltage is restored.

15. A power supply source as recited in claim 14 wherein said microcomputer is responsive to said brownout period indicative signal for suspending the periodic polling of said output signal for inhibiting said shutdown signal.

16. A power supply according to claim 12 wherein said shutdown signal causes said power supply to remain indefinitely in said shutdown mode each time said output signal is generated.

* * * * *

UNITED STATES PATENT AND TRADEMARK OFFICE
CERTIFICATE OF CORRECTION

PATENT NO. : 4,641,064

DATED : February 3, 1987

INVENTOR(S) : William J. Testin and Michael P. French

It is certified that error appears in the above-identified patent and that said Letters Patent is hereby corrected as shown below:

In Claim 13 add the following paragraph between lines 8 and 9:

--a detector responsive to said first supply voltage for generating an output signal when the level of said first supply voltage is below its normal operating level;--.

Signed and Sealed this

Twenty-seventh Day of June, 1989

Attest:

DONALD J. QUIGG

Attesting Officer

Commissioner of Patents and Trademarks